United States Patent [19]
Mackenthun

[11] Patent Number: 5,969,318
[45] Date of Patent: Oct. 19, 1999

[54] GATEWAY APPARATUS FOR DESIGNING AND ISSUING MULTIPLE APPLICATION CARDS

[76] Inventor: Holger Mackenthun, 21 Blue Heron La., Downingtown, Pa. 19335

[21] Appl. No.: 08/977,410
[22] Filed: Nov. 24, 1997
[51] Int. Cl.[6] .................................................. G06K 5/00
[52] U.S. Cl. .......................... 235/380; 235/492; 705/27
[58] Field of Search .................................. 235/380, 375, 235/492; 705/27

[56] References Cited

U.S. PATENT DOCUMENTS

| | | | |
|---|---|---|---|
| 5,220,501 | 6/1993 | Lawlor et al. | 364/408 |
| 5,266,781 | 11/1993 | Warwick et al. | 235/375 |
| 5,534,857 | 7/1996 | Laing et al. | 340/825.34 |
| 5,544,246 | 8/1996 | Mandelbaum et al. | 380/23 |
| 5,615,123 | 3/1997 | Davidson et al. | 364/479 |
| 5,617,528 | 4/1997 | Stechmann et al. | 395/326 |
| 5,619,574 | 4/1997 | Johnson et al. | 380/25 |
| 5,619,683 | 4/1997 | Hans-Diedrich | 395/500 |
| 5,684,742 | 11/1997 | Bublitz et al. | 365/189.01 |
| 5,889,941 | 3/1999 | Tushie et al. | 395/186 |

*Primary Examiner*—Donald Hajec
*Assistant Examiner*—Mark Tremblay
*Attorney, Agent, or Firm*—Imre Balogh

[57] ABSTRACT

An apparatus and method for connecting a card requester with multiple card service providers, whereas the card requester can select multiple services from a menu on a computer screen. The services offered by the multiple service providers can be combined and issued on one card after a successful calculation and simulation of the data was performed by the apparatus. The apparatus consists essentially of a host computer with a specific software, known as gateway apparatus or "Gateway Apparatus for Designing and Issuing Multiple Application Cards" (GADIMAC).

The gateway apparatus connects a card requester with multiple card service providers, transmits all requests from a card requester to selected card service providers, receives service and card required data for the services from the selected card service providers, merges all data by simulating and calculating the best combination of all service specific requirements to coexist on one card, considering different types of card technologies that can be applied to a multiple application card, generates one output file for all card related requirements of different services and transmits the output file to a card manufacturing apparatus that manufactures, personalizes and issues a card. The GADIMAC is the common interface and automated engine to connect various parties, calculate and combine service and card related data in order to present and issue a multiple application card.

6 Claims, 6 Drawing Sheets

|  | | Service Specific Data File SSDF B | | | | | |
|---|---|---|---|---|---|---|---|
|  | | Exclusive | Mandatory | Shared | Optional | | |
| Service Specific Data File SSDF F | Exclusive | ✗ | ✗ | ✗ | F | Limited | Record Length of Technology |
|  | | ✗ | ✗ | ✗ | F | Extended | |
|  | Mandatory | ✗ | B=F | B=F | F | Limited | |
|  | | ✗ | B, F | B=F | B, F | Extended | |
|  | Shared | ✗ | B=F | B=F | B=F | Limited | |
|  | | ✗ | B=F | B=F | B=F | Extended | |
|  | Optional | B | B | B=F | B=F | Limited | |
|  | | B | B, F | B=F | B, F | Extended | |

No data taken from B or F (38) Matrix Calculation Unit

Take data from B only

Take data from F only

Take data from B and F

Take data when equal

GATEWAY APPARATUS FOR DESIGNING AND ISSUING MULTIPLE APPLICATION CARDS

BACKGROUND OF THE INVENTION

1. Field of the Invention

The present invention relates to an integrated circuit card and a plastic card having multiple application capabilities for customer use.

2. Reported Developments

The prior art provides mechanical/electrical systems and processes to load multiple applications from multiple card service providers onto cards and chip card. Those cards may be credit cards, stored value cards, phone cards, transportation cards, health care cards and the like. Typically, magnetic stripe cards and/or imprinted plastic cards contain two applications, whereas more applications may exist on chip cards. The goals of card issuing companies are to penetrate the market of card users with their services by offering their services in conjunction with other card service providers. A bank may issue a service on a card combined with a service of an airline company and telecommunication company in order to share the same customer base. A department store may provide its services on a card in conjunction with a hotel chain and the like.

As a result of the industry trying to penetrate the market with a variety of services, households get bombarded with junk mail offering cards with different services from multiple card service providers, whereby the response from customers is very little. Most of the services are unattractive because the card service providers do not have sufficient information about the customers. Some cards may have the wrong combination of services and therefore become worthless for the customers. Due to a high penetration of cards in the market card issuers face more difficulties to offer new card services.

At the same time the industry is introducing cards with imbedded semiconductors—chip cards which have the capability of offering more services on one card. This approach may reduces the number of cards used by a customer, but it creates other logistic problems including:

- offering and managing the cross relationship of multiple application requirements and those of the card service providers;
- issuing a flexible combination of services on one card that can coexist and avoid that card service providers infringe each other's interest; and
- issuing different card and data storage technologies on one card to ensure a coexistence of multiple services.

It appears that the market has only inadequate solutions and systems to the above problems whereby this invention introduces a system and new method of issuing multiple application cards.

SUMMARY OF THE INVENTION

The present invention is a mechanical/electronic communication system for providing multiple application cards to a card requester. The system comprises of a computer of a card requester, a gateway apparatus and multiple computers from card service providers connected via communication links. The gateway apparatus is a tool and common interface for card requesters and multiple service providers to combine and issue multiple services on one multiple application card.

The card requester connects to the gateway apparatus, called Gateway Apparatus for Designing and Issuing Multiple Application Cards (hereinafter sometimes referred to as GADIMAC). Providers connected to the GADIMAC offer their services in a combined menu. The card requester can browse through the offers of services and select multiple services he would like to have issued on a card. The GADIMAC requests customer specific information which will be provided to all card service providers selected. The card service providers will then download all application specific data necessary for the production and personalization of such a card. The GADIMAC is equipped with a calculation unit which calculates and combines all incoming data to one card specification containing all card related production and personalization data for a multiple application card. The calculation unit checks all information received from each card service provider for conflicting services and production data, whereby such calculation considers card types and technologies from a database III which are available in a production process of a multiple application card. After that the GADIMAC visually simulates and presents a card on a screen considering all services selected by the card requester. When the card requester has finalized the selection of services for a card, the GADIMAC generates an output file of all card related production and personalization data which can be transmitted to a card manufacturer, an automated card manufacturing apparatus or a self service terminal. A confirmation number is issued for each card request which will be stored in connection with the output file in a database II of the GADIMAC. The card requester has different possibilities to obtain the card. One possibility is via mail whereby the output file will be transmitted to a card manufacturer or card manufacturing apparatus. Another possibility is that the output file is sent to a self service terminal from which a request for card issuing was received. Such terminal comprises of a card manufacturing apparatus and can produce, personalize and issue a card on demand.

In accordance with one aspect of the present invention, a mechanical electronic communication system is provided for issuing a multiple application card to a requester of such card comprising:

- a gateway apparatus comprising a host computer capable of managing multiple tasks and having multiple communication ports to connect via communication lines with other computers of card requesters and card service providers;
- a database contained in the gateway apparatus for storing services of card service providers;
- a database contained in the gateway apparatus for storing card requester related information;
- a remote computer of a multiple application card requester electronically connected to said gateway apparatus for inputting a request to said gateway apparatus;
- one or more remote computers of card service providers electronically connected to said gateway apparatus for inputting their offer of services:
  - wherein the gateways apparatus presents services of multiple card service providers in a menu from which the card requester selects desired services;
  - combines and optimizes card related production and personalization data of one or more applications from multiple card service providers for providing services together on one card;
  - visually simulates and presents the card to the card requester on the computer screen of the card requester allowing the card requester to add and remove desired services thereafter;

generates an output file with all card related production and personalization data;

issues a confirmation number to the card requester to confirm his requests;

stores the output file with the related confirmation number in the database II; and transmits the output file to a card manufacturer for producing a card;

In other aspect, the present invention relates to a method for providing a multiple application card to a requester of such card comprising the steps of:

inputting offers of services by multiple card service providers to a gateway apparatus, wherein said gateway apparatus comprises a host computer capable of managing multiple tasks and having multiple communication ports to connect with other remote computers of card service providers having communication lines to said host computer;

inputting on a remote computer to a gateway apparatus a request by a requester of the multiple application card for issuance of said card; wherein said gateway apparatus is capable of simulating multiple applications on cards, presents services of multiple card service providers in a menu from which the card requester selects desired services offered by the multiple card service providers;

receiving the card requester's selection of services;

combining and optimizing card related production and personalization data of one or more applications from multiple card service providers to provide services together on one card;

visually simulating and presenting the card to the card requester on the computer screen of the card requester allowing the card requester to add and remove desired services thereafter;

generating an output file with all card related production and personalization data;

issuing a confirmation number to the card requester to confirm his requests;

storing the output file with the related confirmation number in a database; and transmitting the output file to a card manufacturer, card manufacturing apparatus or self service terminal to produce a card.

DETAILED DESCRIPTION OF THE PREFERRED EMBODIMENT

In the description the terms used have the following definitions:

card service provider means a company that is offering and providing its services to customers, and typically providing a card with the service;

application means a service, such as banking, phone, health, hotel, car rental, airline provided on a card;

card means an identification card based on the specifications and dimensions of the International Standard Organization ISO generally used for credit cards and the like;

chip card means a card with embedded semiconductor, able to communicate with a terminal and to perform different programs and applications;

card design means a process of defining all card specific characteristics, data and technologies for a card or chip card such as graphical layout, magnetic stripe, embossing, signature stripe, hologram, card type, chip type and chip technology;

card producing means a process of physically manufacturing a card from a variety of base materials and/or taking a blank predefined card or chip card and printing the card;

card personalization means taking a produced card or chip card and customize it for the user on the card, such as adding applications, printing a photo, embossing a name, encoding an account number onto the magnetic stripe and loading data and download programs into the semiconductor of the chip card.

Figure 1:
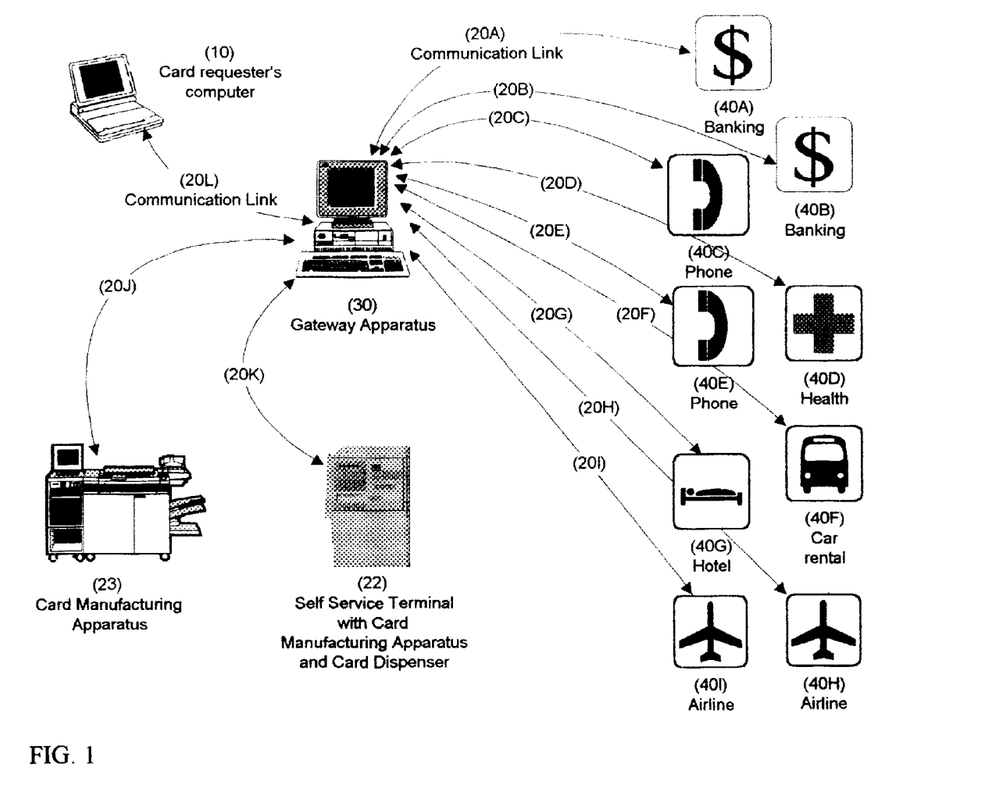
FIG. 1: Overview of system and infrastructure.

FIG. 1 is an overview of the system of the present invention showing the different links of the gateway apparatus 30. The computer of the card requester 10 can be any remote computer that is being used by a card requester to connect to the gateway apparatus 30, such as a home computer, a palmtop computer, a mobile phone or an access terminal such as a computer terminal integrated into the passenger seats of airplanes. A communication link 20L between the computer of the card requester 10 and the gateway apparatus 30 can take place by direct data line, a modem, wireless or via Internet.

Numerals 40A through 40I are symbolizing examples of card service providers that are connected via communication links 20A through 20I with the gateway apparatus 30.

The gateway apparatus 30 has the ability to connect multiple card requesters from multiple computers of card requesters 10. It handles the request from the card requester for a card, collects all information needed to manufacture and personalize a card from the card service provider, checks and combines the data and generates one output file. Such file can be transmitted via communication link 20J to a card manufacturing apparatus 23. Alternatively, the card requester may choose to have the card issued from a self service terminal 22 connected via communication link 20K, whereby this self service terminal comprises of a card manufacturing apparatus.

Figure 2:
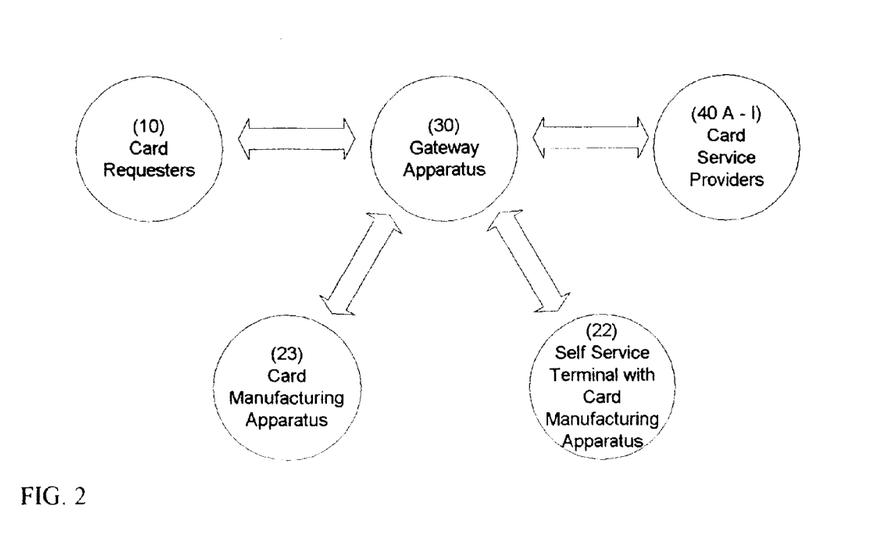
FIG. 2: Flow diagram of the system shown in FIG. 1.

FIG. 2 is the flow diagram of the system shown in FIG. 1. The gateway apparatus 30 connects card requester 10 with card service providers 40A through 40I and is able to simulate a requested card for which it generates an output file that can be transmitted to a card manufacturing apparatus 23 and/or to a self service terminal with a card manufacturing apparatus 22.

Figure 3:
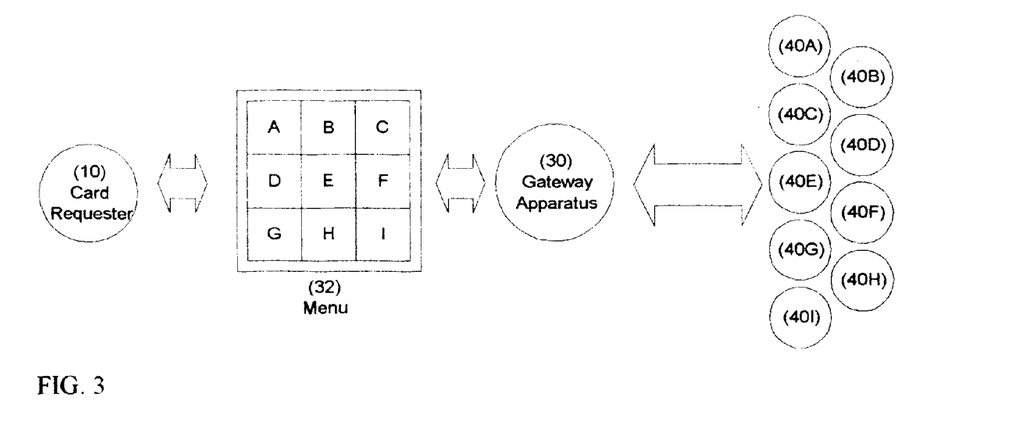
FIG. 3: Flow diagram of input from card service providers to gateway apparatus and card requester.

FIG. 3 shows a diagram of input from card service providers to the gateway apparatus and a card requester 10. 40A through 40I represent the card service providers which connect to the gateway apparatus 30 and the gateway apparatus presents services A through I in a selection menu 32 to the card requester 10. Services A through I are offered from service providers 40A through 40I.

Figure 4:
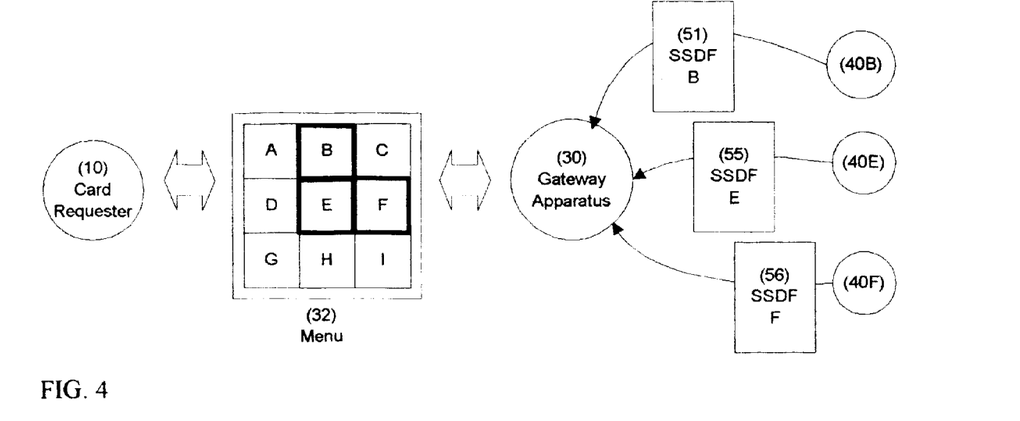
FIG. 4: Flow diagram of information exchange between card requester, gateway apparatus and card service provider.

FIG. 4 shows a flow diagram of information exchange between card requester, gateway apparatus and card service provider. In this figure a sample case is presented whereby the card requester 10 has selected the services B, E and F from the menu 32 listed by the gateway apparatus 30. Card service providers 40B, 40E and 40F communicate with the gateway apparatus 30 which in turn provides and exchanges information with the card requester 10. After the exchange of information between the gateway apparatus and the card requester, each provider downloads its service specific data files SSDF B 51, SSDF E 55 and SSDF F 56 necessary for the card design to the gateway apparatus. The structure of the service specific data files SSDF B, SSDF E and SSDF F are explained in FIG. 6 in more detail.

Figure 5:
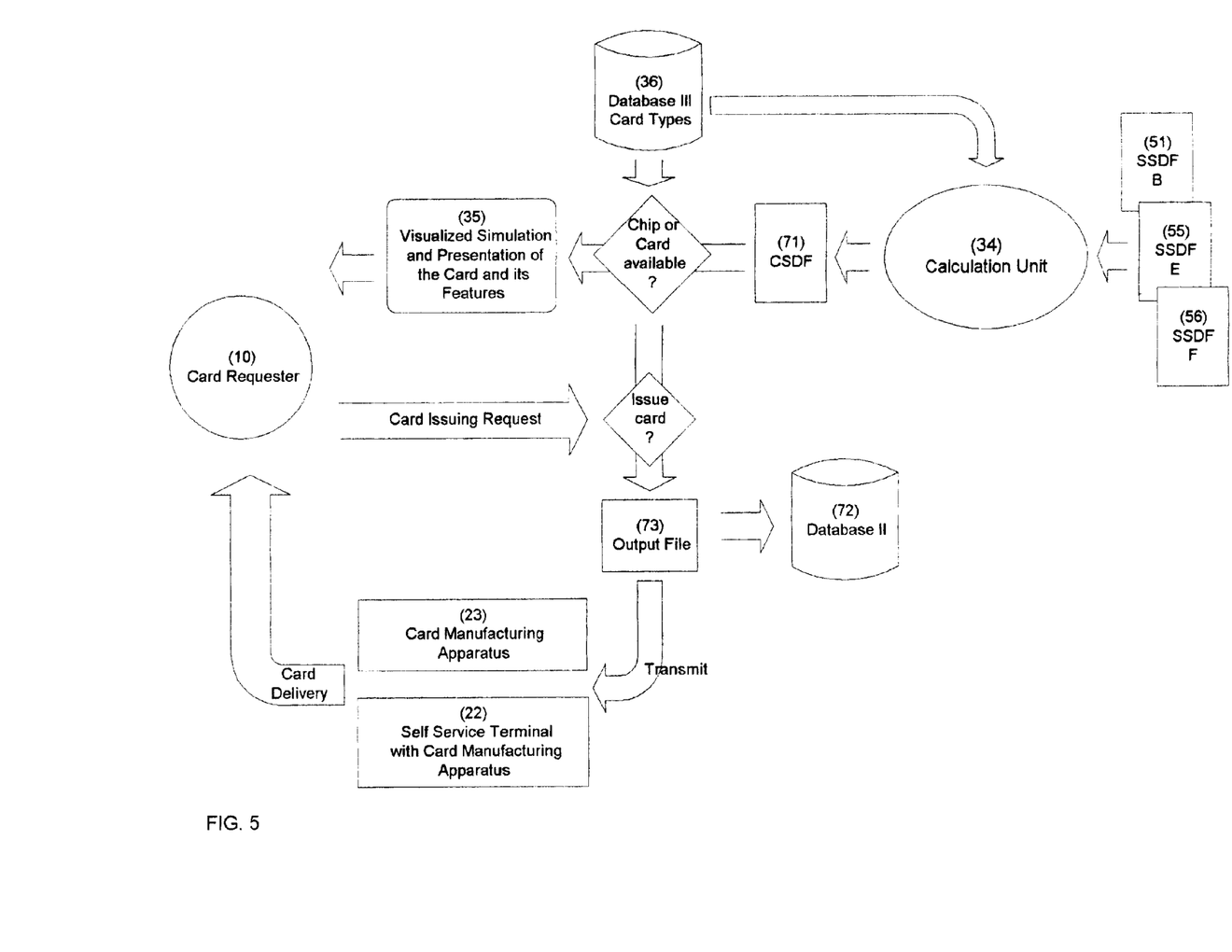
FIG. 5: Flow diagram of the process of simulating the multiple service card by the gateway apparatus when receiving the service specific data file and generating a card specific data file.

FIG. 5 shows a flow diagram of the process of simulating the multiple service card by the gateway apparatus when receiving the service specific data file and generating a card specific data file.

The service specific data files SSDF B 51, SSDF E 55 and SSDF F 56 and the input from the database III 36 of card types are processed by the calculation unit of the gateway apparatus every time a new service is selected by the card requester. This process calculates the card specific data file CSDF 71. Based on the data provided in CSDF 71 a card will be visually simulated by 35 and presented on the screen to the card requester 10, at the same time it lists all features of the services on the screen. The CSDF 71 consists of data B, E and F selected and merged from SSDF 51, 55 and 56 for a multiple application card. The requirements for a certain chip and card specific technology will be checked with database III 36. Database III 36 contains a list of market available cards and chip cards that can be processed by a card manufacturing apparatus 23 or 22. When a positive check is performed, the CSDF will be forwarded for further processing and a card will be simulated in 35 and presented to the card requester 10. Every time a card is presented, the card requester has the choice to add or remove services which will start the calculation process 34 and simulation 35 repeatedly. When the card requester 10 has finalized his design he then has to determine how the card shall be issued an output file 73 will be generated. At the same time a confirmation number will be presented to the card requester. The output file 73 and the confirmation number will be stored in the database II 72. Based on the card requester's selection the output file 73 will be transmitted to a card manufacturer and/or card manufacturing apparatus 23 or a self service terminal with an integrated card manufacturing apparatus 22.

Figure 6:
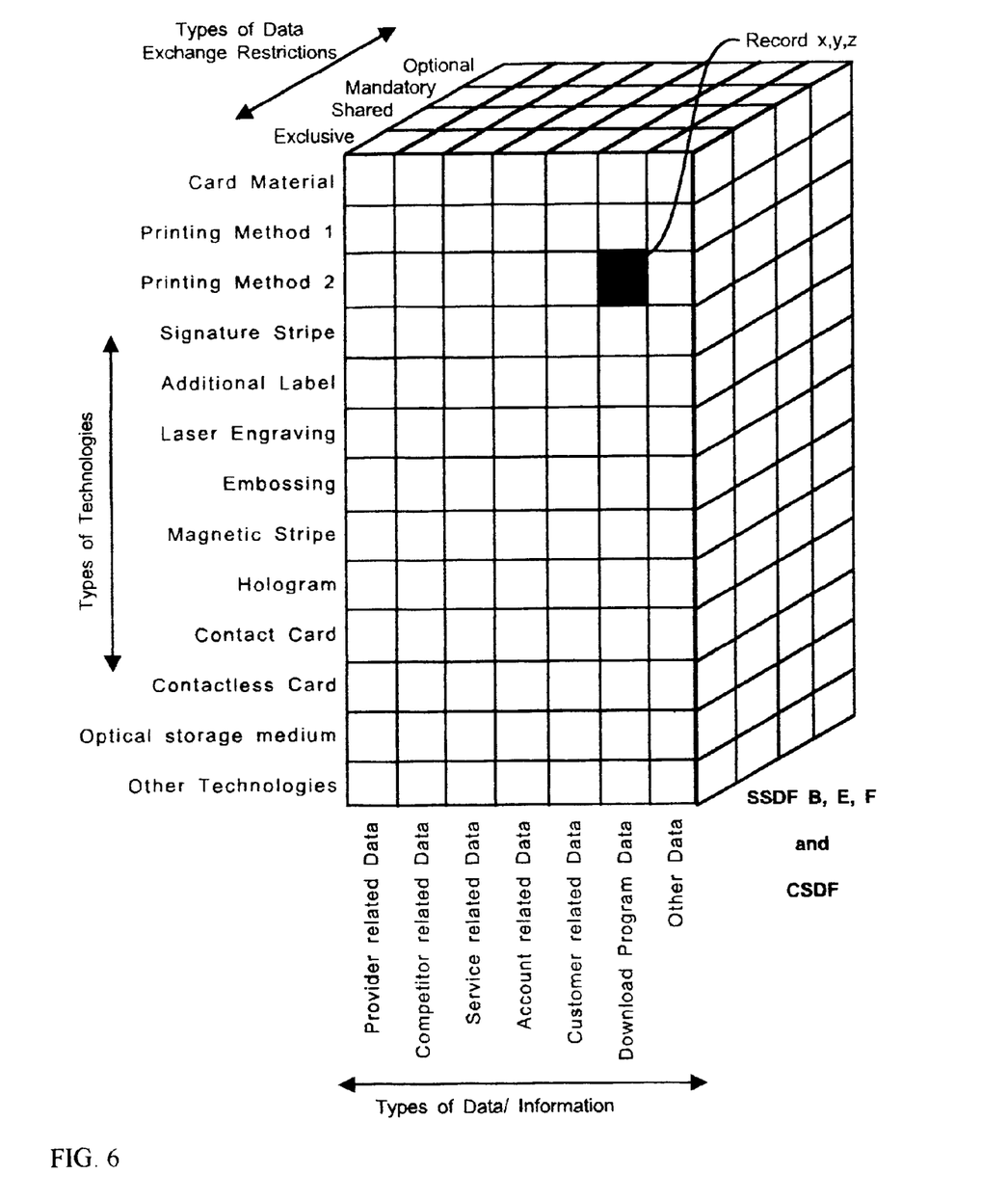
FIG. 6: Data structure of a service specific data file and the card specific data file.

FIG. 6 shows the data structure of a service specific data file and the card specific data file. Service specific data files SSDF and card specific data files CSDF contain records with card service provider specific data/information. Records of the same kind have the same x,y,z position in the SSDF and CSDF. Each record contains the types of data/information, types of technologies and types of data exchange restrictions.

The service specific data files SSDF and card specific data files CSDF have a minimum of three groups of information which will be explained by some examples:

types of technologies, such as magnetic stripe and/or chip;
types of data/information, such as account number and/or name of card holder; and
types of data exchange restrictions, such as mandatory data or optional data.
Types of technologies include, for example:
card material, such as Polyester and/or thickness;
printing method 1, such as screen print;
printing method 2, such as dye sublimation;
signature stripe, such as applying labels for signatures;
additional label, such as applying stickers with instructions how to use a newly received card;
laser engraving, such as engraving a serial number or image;
embossing, such as embossing the card number;
magnetic stripe, such as encoding the bank related account number;
hologram, such as adding a secure identification hologram label;
contact card, such as a card with imbedded chip for banking applications working with a contact interface;
contactless card, such as a card for public transportation applications working with a contactless interface;
optical storage medium, such as a card for storing large amount of data; and
other technologies, such as punching holes or applying special surface structures.
Types of data/information include, for example:
provider related data, such as company print logo and/or design;
competitor related data, such as a list of competitors with whom the card service provider does not want to combine his service on a card;
service related data, such as expiration date of service;
customer related data, such as name or a picture of the card requester;
download program, such as an executable program to perform a special application in the chip; and
other data, such as third party agency related data.
Types of data exchange restrictions are organized as follows with some examples given by using different technologies:
exclusive, for example, restricting the memory of a chip to one card service provider only;
shared, for example, embossing the name of the card requester that will be shared among all card service providers;
mandatory, for example, the card number has to be encoded on the magnetic stripe; and
optional, for example, the corporate logo of the card service provider may be printed on the card in any spot.

The three dimensional model of the service specific data file SSDF shows the complexity of the data that have to be calculated and combined by the calculation unit 34 of the gateway apparatus 30. Any of the combinations between the groups for types of technologies, types of data/information and types of data exchange restrictions may be specified for a particular service on a card and has to be considered.

The gateway apparatus requires the same structure of file from each card service provider and for each service. Each file is file is organized in records which contain the data. The gateway apparatus is able to analyze, calculate and combine the data of related records from different card service providers in order to generate one card specific data file CSDF for all combined service requirements. Related records are those which have the same x,y,z coordinations. The structure of the service specific data file and the card specific data file are the same, shown in FIG. 7.

Figure 7:
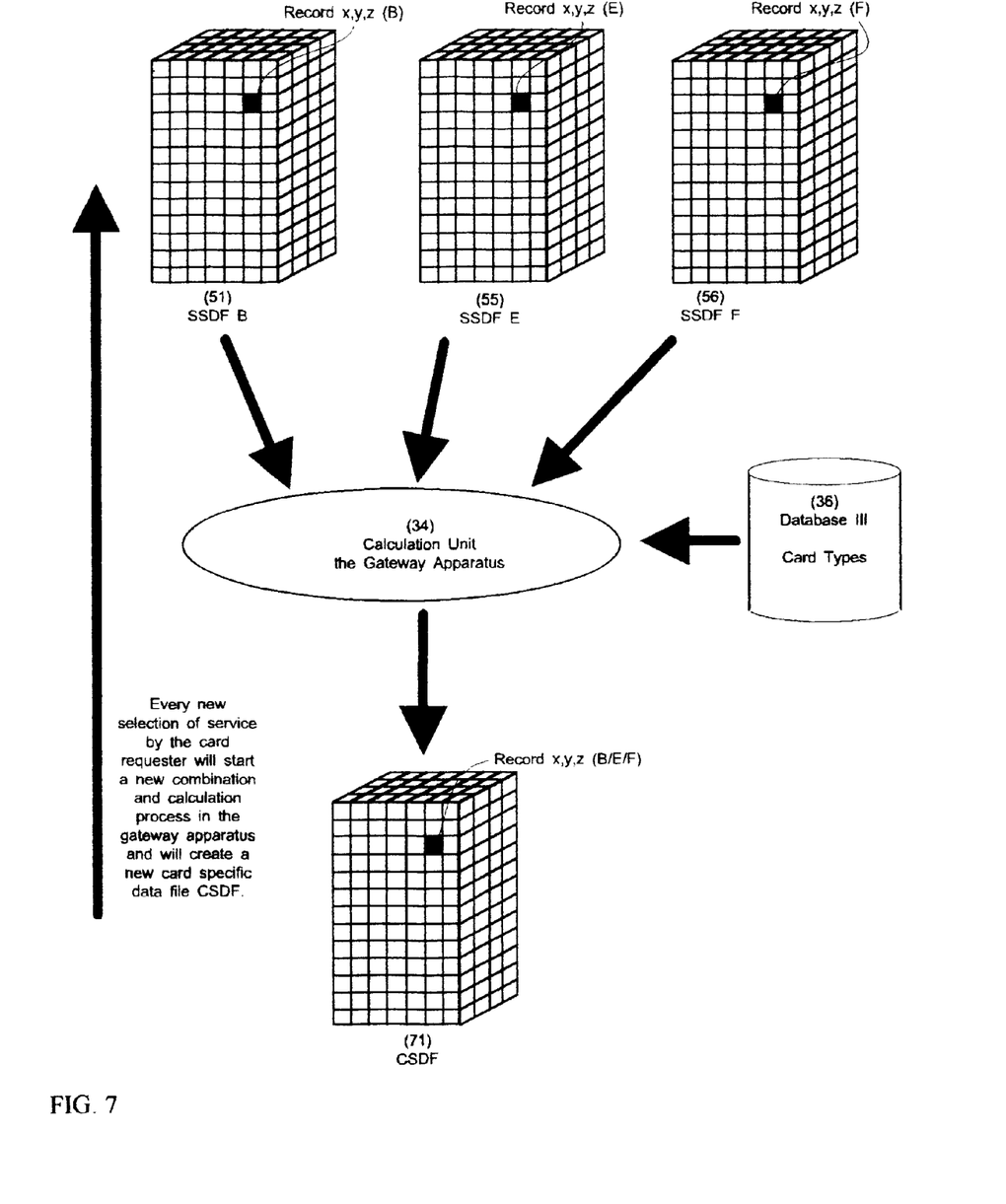
FIG. 7: Detailed flow diagram of the process of calculating the card specific data file for a multiple service card.

FIG. 7 shows a detailed flow diagram of the process of calculating the card specific data file for a multiple service card. The service specific data files SSDF B 51, SSDF E 55 and SSDF F 56 together with the data in database III 36 of card types will be processed by the calculation unit 34 of the gateway apparatus. This process is combining the related records of the service specific data files SSDF B, SSDF E and SSDF F and is calculating the best and maximally possible combinations of data which will then be stored in the card specific data file CSDF. Related records are of the same kind have the same x, y, z positions in each service specific data file and card specific data file.

Each CSDF consist of all necessary data to manufacture a card, including data regarding the chip and card type which will be provided by the database III 36 of card types. The returning arrow demonstrates that every new selection of services by the card requester will start a new calculation process and simulation in the gateway apparatus and will overwrite the card specific data file CSDF.

Figure 8:
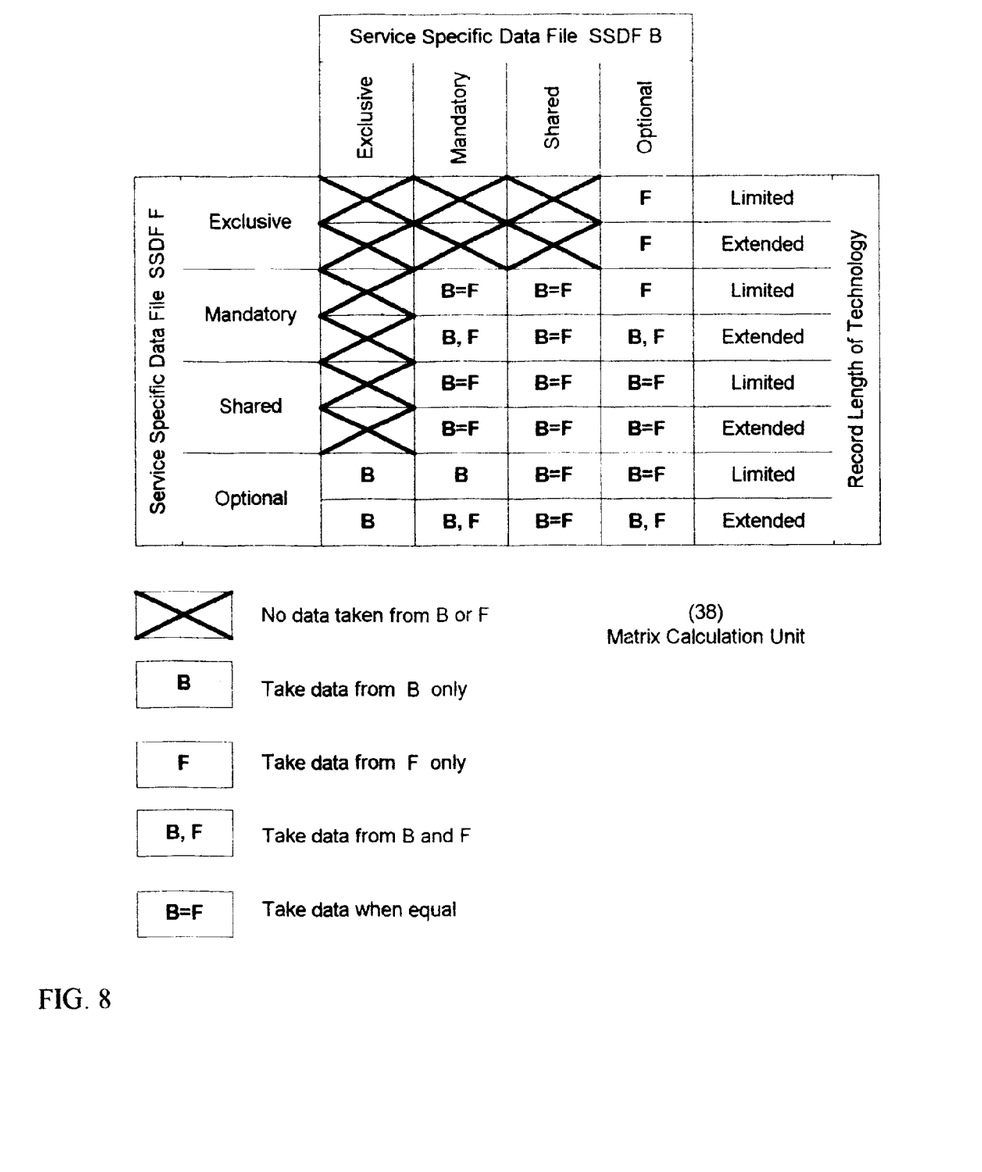
FIG. 8: Matrix calculation process applied by the gateway apparatus to calculate and combine the card specific data file from FIG. 7.

FIG. 8 shows a matrix calculation process applied by the gateway apparatus to calculate and combine the card specific data file from FIG. 7. An example is provided for the simulation and calculation process of how the gateway apparatus merges the data. Service specific data files SSDF B and SSDF F contain records with card service provider specific data/information B and F. Each record contains the types of data/information, types of technologies and types of data exchange restrictions.

Only records of the same kind from different card service providers will be combined by the matrix calculation unit 38. The example is shown for one technology and one data/information.

The matrix calculation unit considers the type of technology which is used to apply or personalize such data/information to the card. The type of card technology specified for one record may limit the length of a record and the combination possibilities with others. A particular technology may be able to apply only one record from one card service provider on a card. An example is the embossing of the card number, whereby this number has a standardized position and length of 16 characters on the card. This means that two card numbers, each consisting of 16 characters, cannot be applied to the card, but 2 numbers, each consisting of 8 characters is possible. Therefore, the calculation matrix 38 has to consider the possible record lengths of each technology:

limited, meaning only one record length is possible to apply to a card; or extended, meaning two or more records can be applied to the card.

Each record of the service specific data file has certain types of data exchange restrictions:

exclusive data, meaning that certain types of data/information of two or more card service providers shall never be applied and/or personalized on the same card;

mandatory data, meaning that certain types of data/information of one or more card service providers have to be provided, applied and/or personalized on the card;

shared data, meaning that certain types of data/information of one or more card service providers have to be equal, applied and/or personalized on the card; and optional, meaning that certain types of data/information of one or more card service providers may or may not be applied and/or personalized on the card.

This matrix demonstrates the combination possibilities for one type of technology and one type of data/information of related records received from the service specific data files SSDF B and SSDF F. The result of this calculation builds a new record stored. Such record will be used again by combining and calculating it with the related record of SSDF E. The obtained result is the calculated and combined record of SSDF B, SSDF E and SSDF and will be stored in a related record of the card specific data file CSDF.

The calculation process will be applied to all records of the service specific data files SSDF.

Further reference will now be made to the system and infrastructure used in the present invention:

The gateway apparatus comprises a host computer that can manage multiple tasks and has multiple communication ports to connect to other computers. Communication links are established with each card service provider with whom the operator of the gateway apparatus has a contract to offer his services. Those services are stored in the database I. Through its software the gateway apparatus provides a menu which offers and combines multiple services of card service providers, including competing companies. A card requester connected to the gateway apparatus via his computer can browse through the offers contained in the software of the gateway apparatus, connect to each card service provider and select the services that suit him. The communication will take place by entering data using a keyboard, computer mouse or, optionally, when selected by the card requester, he can talk to a live person of the card service provider via audio-visual communication. The gateway apparatus requests and receives personal information from the card requester that will be made available by the gateway apparatus to all selected card service providers so that the user does not have to enter personal information again for each card service provider during the session. When selecting a service, the card requester can be connected directly to the card service provider through the gateway apparatus and can select specific offerings of that company. For specific services, such as opening a credit card account, a card service provider may require more personal information that will only be available to this card service provider.

The gateway apparatus collects and stores all necessary personal data from the customer and stores the request for services. Additional application specific data will be inquired by the gateway apparatus from each selected card service provider. Some data may be different for each application and others may be the same. Data such as download programs for specific services may differ in every case but the name and account number to be embossed on a card is mandatory and will be shared among all card service providers. The gateway apparatus also inquires specific card layout data, colors, logos, magnetic stripe encoding data and embossing data. The gateway apparatus will collect all of the above information. Since the gateway apparatus's task will be to create one card with multiple services, it will consider and incorporate as many requirements as possible. The gateway apparatus needs to know which data per application are mandatory and which data are optional, which data are exclusive and which data may be shared and merged among the different services. It needs to know from each selected card service provider a list of competitive companies that shall not be combined on one card.

For example:

when two banks offer similar services they probably want to exclude the possibility to be issued on one card; or the gateway apparatus cannot issue a card when requirements of card service providers are conflicting, such as two card service providers require the same spot on a multiple application card for printing their logos.

The mandatory requirement list, the character of the data, whether permissible or restricted, and the list of competing companies is very important for the gateway apparatus to perform its task. Such information will be inquired from each card service provider by the gateway apparatus for further processing.

Every time a new service is selected by the card requester, the gateway apparatus calculates a new combination of services for one card. Based on the data provided from the card service providers and the result from the calculation the gateway apparatus will design and simulate a card with the best combination of multiple services and will present it visually to the card requester. The card requester will see a card with ready artwork, showing all the different labels of the card service providers on the card. Also, a list of services and features is provided that can be reviewed and printed by the card requester. The gateway apparatus combines all necessary data needed to manufacture such card in one output file. This output file can be sent to a card manufacturer or card manufacturing apparatus which prints the card, embosses information on the card, encodes information on the magnetic stripe of the card and downloads the application programs into the chip of the card.

The process performed by the gateway apparatus includes:

- checking for competing companies and services and proposing a solution;
- checking the size of all download programs to fit on a suitable chip card which is selected from the database III of card types and technologies;
- checking the interface requirements of the communication type of the chip card, whether a contact interface and/or contactless interface is required and propose a chip card type from the database III;
- checking card printing data, such as conflicting colors for the layout and presenting a solution;
- checking company logo specific design data, such as colors, size and preferred location on the card;
- checking magnetic stripe card encoding requirements of all services and presenting a solution;
- checking embossing requirements of all services and presenting one solution;
- checking other card requirements and presenting a solution;
- checking which requirements of services are conflicting, are restricted, mandatory, optional, exclusive or shared and present a solution;
- generating response messages to the card requester;
- designing and presenting a visualized card to the card requester; and
- generating one card specific data file and card manufacturing output file for every new service selection of the card requester.

The gateway apparatus with its calculation unit checks and combines all of the application specific requirements to be initialized on a card. In case the calculation unit finds conflicting mandatory requirements of different services, it will recommend alternative solutions by considering a subset of selected applications only. The personalized card containing the applications will be simulated and shown with its graphic design on the screen of the card requester's remote computer including a list of all service features of the card. Based on the simulation and the final selection for a card, the gateway apparatus generates an output file containing all information necessary to produce and personalize a card. At the same time the gateway apparatus issues a confirmation number to the card requester. Output file and confirmation number will be stored in the database II, containing all issued cards.

A multiple application card can be produced from different card types incorporating different technologies. Card types and technologies are stored in the database III. When calculating the output file the calculation unit incorporates the information of the database III in order to present the best card choice and technology for the services selected.

A card manufacturing apparatus typically takes a blank card or chip card from stock and applies the provided data to print the graphics of the card, encodes the magnetic stripe, embosses the card and downloads the programs into the chip of the card. All of these technologies have different ways of storing the data physically on a card and have different limitations on the capacity of storage space. For example, download programs of applications can only be loaded into chip cards when the semiconductor of a chip card has the right memory size for all applications. Therefore, the gateway apparatus will apply the card and technology specifications to the calculation process in order to select the best card and card technology for the required multiple application card. Usually, a service provider would not specify a card type but would provide the requirements for such card leaving it to the gateway apparatus to apply the right card. However, if a service provider requires a special card type and such card is not available the gateway cannot issue this service on a card.

The gateway apparatus acts as an intelligent filter combining only those applications on one card that are possible. It becomes obvious that the card service providers will have to limit their mandatory requirements for the card design in order to make it as easy as possible for the gateway apparatus to add their services to almost any card inquiries and combination of services.

The output file will be generated from the card specific data file when the design of the card is completed. The card requester can choose how to receive the card. If mail delivery is chosen, the gateway apparatus will send its data to a card manufacturer or to a location that has a card manufacturing apparatus. A white card or chip card will be printed and personalized and mailed to the card requester.

Another way of obtaining the card by the card requester is to pick it up from a self service terminal that is usually located in a public area. The self service terminal comprises a card manufacturing apparatus that can print, personalize and issue a card. The gateway apparatus will hold the output file until a request is received via communication link from any self service terminal. The request for issuing a card from a self service terminal is initiated by the card requester while he is operating the terminal by entering the confirmation number which is sent to the gateway apparatus. The gateway apparatus then browses through the database II and transmits the output file which confirmation number matches the one received. The self service terminal receives the output file, produces, personalizes and issues the multiple application card.

Example of a working model:

A card requester is connecting with his home computer to the Internet. He is connecting to the WEB-SITE of a company that offers multiple services from different card service providers from a gateway apparatus. The first site is an overview of the companies products and promises that the company can issue multiple services on one card, it provides a possibility to click an icon for switching to the next menu that will request information from the card requester. The next screen shows a main menu with different selection icons for BANK, AIRLINE, CAR RENTAL, HOTEL, PHONE and OTHERS. OTHERS may be retailers and public transportation companies. By selecting the BANK icon, a menu appears asking for some general identification data, such as name, address, phone number and social security number. This information will be stored by the gateway apparatus. Once completed, it will give the card requester a selection menu of different banks. When selecting a specific bank, a communication link will be established by the gateway apparatus to the card service provider bank and the card requester is connected with the banks computer and can chose from their menu of bank specific services. For issuing a bank service the bank may need more data from the customer, such as another credit card or driver license for authentication of the person. This request may not be needed when requesting services for simple loyalty programs, for example from an airline. When this inquiry is completed the card requester returns to the main menu. His next selection is a car rental whereby the gateway apparatus guides him through a variety of companies. When the card requester selects a special company the customer specific data which where entered at the beginning will be provided to this card service provider and the card requester receives his service. After every selection of services the main menu appears and gives the card requester the option to add more services or to finalize the card design and have a card issued. Every time a selection is completed the gateway apparatus will start a simulation and calculation process and will notify the card requester whether the services can coexist on the card and will list all the benefits of the selected services. At the same time it will also present the card visually to the card requester. In the present example the card requester selected two bank services and received the notification that the selected services cannot coexist on one card since the card service providers excluded this possibility by providing a list of competitors in their service specific data file to the gateway apparatus.

After selecting five services, the card requester decides to have the card issued. A confirmation number will be presented to the card issuer for future reference of the request.

Two possibilities of card issuing and card delivery can be selected in the menu by clicking the icons:

a. via mail delivery; and b. via self service terminal which are both explained in the followings.

a. Via mail:

The card specific data file will be converted to an output file and transmitted from the gateway apparatus to a card manufacturing apparatus at a remote location. At the same time the card specific data file will be transmitted to every selected card service providers. The card will be manufactured and personalized by the card manufacturing apparatus and send via mail to the card requester's address. The card requester receives a plastic card with a chip carrying the printed logos of five companies, such as a bank, a car rental company, hotel chain, phone company and a department store.

b. Via self service terminal

This option provides the possibility to pick up the card from a location with a self service terminal that contains a card manufacturing apparatus and a card dispenser. The gateway apparatus presents a list of self service terminal locations to the card requester. At the card requester's convenience he will go to any terminal and enters the conformation number. The terminal will transmit to the gateway apparatus its location and a request for transmitting the card data related to the previously issued and matching confirmation number. The card specific data file will be converted to an output file and transmitted from the gateway apparatus to the self service terminal with integrated card manufacturing apparatus. The card will be processed by the terminal and at the same time the card specific data file will be transmitted from the gateway apparatus to each of the selected card service providers. The card will be manufactured and personalized by the terminal and issued by the card dispenser of the terminal. The card requester receives a plastic card with a chip carrying the printed logos of five companies, such as a bank, a car rental company, hotel chain, phone company and a department store.

For both issuing methods the benefits for the customer are:

carrying only one card instead of five;

simplified account management due to combined personal identification PIN number for all services;

the card is very practical and valuable to the customer since it contains services which he selected and are valuable for him; and he is collecting loyalty points and benefits from all card service providers that may be shared and accepted among them.

What is claimed is:

1. A mechanical/electronic communication system for providing a multiple application card to a requester of such card comprising:

a gateway apparatus comprising a host computer capable of managing multiple tasks and having multiple communication ports to connect via communication lines with other computers of card requesters and card service providers;

a database I contained in the gateway apparatus for storing services of card service providers;

a database II contained in the gateway apparatus for storing card requester related information, a remote computer of a multiple application card requester electronically connected to said gateway apparatus for inputting a request to said gateway apparatus;

one or more remote computers of card service providers electronically connected to said gateway apparatus for inputting their offer of services:

wherein the gateway apparatus further comprises:

means for presenting services of multiple card service providers in a menu from which the card requester selects desired services;

means for combining and optimizing card related production and personalization data of one or more applications from multiple card service providers for providing services together on one card;

means for visually simulating and presenting the card to the card requester on a computer screen of the card requester allowing the card requester to add and remove desired services thereafter;

means for generating an output file with all card related production and personalization data;

means for issuing a confirmation number to the card requester to confirm his requests;

means for storing the output file with the related confirmation number in the database II; and means for transmitting the output file to a card manufacturer for producing a card.

2. The gateway apparatus of claim 1 having a database III for card types, a calculation unit and simulation unit, wherein this gateway apparatus further comprises:

means for providing information of card types and card technologies from its database III to the calculation unit to simulate and propose the best solution for a specific multiple application card;

means for forwarding information between a card requester and a selected card service provider;

means for requesting customer specific information from the card requester and forwarding such information to all selected card service providers;

means for requesting all card related production and personalization data of each application provided by the card service providers to perform the services on a card;

means for requesting from each card service provider information of competing card service providers;

means for further requesting from each card service provider their conditions of combining and applying services together on one card;

means for organizing all data received from the card service providers into a format that enables the calculation unit to combine data of related services;

means for calculating the maximum combination and possibilities of all related data received from each card service provider in conjunction with the information of the database III of card types and generates one output file with all specifications for producing and personalizing a multiple application card;

means for simulating an optimized card with the calculated data and presenting said design to the card requester;

means for evaluating the data integrity of multiple applications and card technologies, and means for identifying conflicting services and card specifications to perform services on one card, whereby in case of a conflict the said card simulation unit will notify the card requester and will recommend alternative solutions by applying only a subset of services on the card.

3. The mechanical/electronic communication system of claim 1 wherein said gateway apparatus is connected via communication lines to an automated card manufacturing apparatus and wherein the gateway apparatus further comprises means for transmitting its output file to said card manufacturing apparatus for producing, personalizing and issuing a multiple application card.

4. The mechanical/electronic communication system of claim 1 wherein said gateway apparatus is connected via communication lines to a self service terminal with an integrated card manufacturing apparatus together further comprising:

means for receiving a confirmation number entered by a card requester at said self service terminal;

means for browsing through a database and selecting an output file with associated confirmation number which matches the one received from the self service terminal; and means for transmitting the selected output file from the database II to the self service terminal for producing, personalizing and issuing a multiple application card.

5. A method for providing a multiple application card to a requester of such card comprising the steps of:

inputting offers of services by multiple card service providers to a gateway apparatus, wherein said gateway apparatus comprises a host computer capable of managing multiple tasks and having multiple communication ports to connect with other remote computers of card service providers having communication lines to said host computer;

inputting on a remote computer to a gateway apparatus a request by a requester of the multiple application card for issuance of said card; wherein said gateway apparatus is capable of simulating multiple applications on cards, presents services of multiple card service providers in a menu from which the card requester selects desired services offered by the multiple card service providers;

receiving the card requester's selection of services;

combining and optimizing card related production and personalization data of one or more applications from multiple card service providers to provide services together on one card;

visually simulating and presenting the card to the card requester on the computer screen of the card requester allowing the card requester to add and remove desired services thereafter;

generating an output file with all card related production and personalization data;

issuing a confirmation number to the card requester to confirm his requests;

storing the output file with the related confirmation number in a database; and transmitting the output file to a card manufacturer, card manufacturing apparatus or self service terminal to produce a card.

6. The method of claim 5 wherein said gateway apparatus combines multiple card design specific requirements to one specification for producing a multiple application card comprising the steps:

providing information of card types and card technologies from a database to a calculation unit to simulate and propose the best solution for a specific multiple application card;

forwarding information between a card requester and selected card service providers;

requesting customer specific information from the card requester and forwarding such information to all selected card service providers;

requesting all card related production and personalization data of each application provided by the card service providers to perform the services on a card;

requesting from each card service provider information of competing card service providers;

further requesting from each card service provider their conditions of combining and applying services together on one card;

organizing all data received from the card service providers into a format that enables the calculation unit to combine data of related services;

calculating the maximum combination and possibilities of all related data received from each card service provider in conjunction with the information of a database of card types and generates one output file with all specifications for producing and personalizing a multiple application card;

simulating an optimized card with the calculated data and presenting said design to the card requester;

evaluating the data integrity of multiple applications and card technologies, and identifying conflicting services and card specifications to perform services on one card, whereby in case of a conflict the said card simulation unit will notify the card requester and will recommend alternative solutions by applying only a subset of services on the card.

* * * * *